United States Patent [19]
Greenslade

[11] Patent Number: 5,987,764
[45] Date of Patent: Nov. 23, 1999

[54] EXTERNAL THREAD GAGE

[76] Inventor: Joe E. Greenslade, 2118 Edwin St., Fort Worth, Tex. 76110

[21] Appl. No.: 08/895,047

[22] Filed: Jul. 16, 1997

[51] Int. Cl.$^6$ ........................................................ G01B 3/00
[52] U.S. Cl. .............................. 33/555.1; 33/783; 33/792
[58] Field of Search .................................. 33/555.1, 783, 33/784, 792, 794, 795

[56] References Cited

U.S. PATENT DOCUMENTS

| | | | |
|---|---|---|---|
| 2,609,614 | 9/1952 | Johnson | 33/199 |
| 2,611,970 | 9/1952 | Johnson | 33/174 |
| 2,725,637 | 12/1955 | Johnson | 33/174 |
| 3,270,424 | 9/1966 | Johnson | 33/174 |
| 3,318,011 | 5/1967 | Johnson | 33/199 |
| 3,353,277 | 11/1967 | Johnson | 33/199 |
| 3,354,553 | 11/1967 | Heldmaier | 33/810 |
| 3,358,376 | 12/1967 | Johnson | 33/199 |
| 5,056,238 | 10/1991 | Chi | 33/810 |

OTHER PUBLICATIONS

Johnson Ring–Snap, The Johnson Gage Company brochure, pp. 2–3.
Thread Dimensional Safety, The Johnson Gage Company brochure.
Variables Type External Thread Gaging System, The Johnson Gage Company brochure.
External Thread Gaging Systems, ITW Zero Systems brochure.

*Primary Examiner*—Bernard Roskoski
*Attorney, Agent, or Firm*—James E. Bradley

[57] ABSTRACT

A gage for measuring the external threads of a threaded body has a segment housing formed from a housing body. The housing body has a generally U-shaped cross section with a bottom extending between a pair of opposite, upright sidewalls so that a channel with a longitudinal axis is defined. First and second gage segments are configured to engage the threads of the threaded body when the threaded body is positioned between the first and second segments and the first and second segments are closed together. The first gage segment is fixed to the housing body, and the second gage segment is received within the channel of the housing body. The second gage segment moves linearly within the channel along the longitudinal axis to allow the first and second segments to be separated for insertion of the threaded body between the first and second segments. This also allows the first and second segments to be closed together for engagement with the threaded body. An indicator having a movable indicator shaft that actuates the indicator is mounted to the housing body. The indicator shaft is spring loaded so that the indicator shaft projects into the channel of the housing and engages the second gage segment, urging the second gage segment within the channel into engagement with the threaded body.

2 Claims, 2 Drawing Sheets

EXTERNAL THREAD GAGE

BACKGROUND OF THE INVENTION

1. Field of the Invention

This invention relates to a device for measuring the external threads of a threaded fastener.

2. Description of the Prior Art

Threaded fasteners such as screws and threaded bolts must meet minimum tolerances in order to avoid damage and to ensure proper functioning of the fastener during tightening and loosening operations. For this reason, thread gages have been designed for gaging the diameter of the screw threads. While there are various devices for measuring the external threads of these fasteners, they are often complex in design. The devices usually involve gaging segments that are pivotally mounted on arms so that the segments can be open and closed around the threaded fastener. Often, removal and replacement of the segments from such devices is difficult and time consuming.

What is therefore needed is an external thread gage that is reliable and simple in design and that allows the gage segments to be easily removed and replaced.

SUMMARY OF THE INVENTION

A gage for measuring the external threads of a threaded body has a segment housing formed from a housing body. The housing body has a generally U-shaped cross section with a bottom extending between a pair of opposite, upright sidewalls so that a channel with a longitudinal axis is defined. First and second gage segments are configured to engage the threads of the threaded body when the threaded body is positioned between the first and second segments and the first and second segments are closed together. The first gage segment is fixed to the housing body, and the second gage segment is received within the channel of the housing body. The second gage segment moves linearly within the channel along the longitudinal axis to allow the first and second segments to be separated for insertion of the threaded body between the first and second segments. This also allows the first and second segments to be closed together for engagement with the threaded body. Means for urging the second gage segment within the channel into engagement with the threaded body is also provided. An indicator having a movable indicator shaft projects into the channel of the housing and engages the second gage segment when the second segment is engaged with the threaded body so that the indicator is actuated to thereby indicate a measured value of the threaded body.

Additional objects, features and advantages will be apparent in the written description which follows.

DETAILED DESCRIPTION OF THE INVENTION

Figure 1:
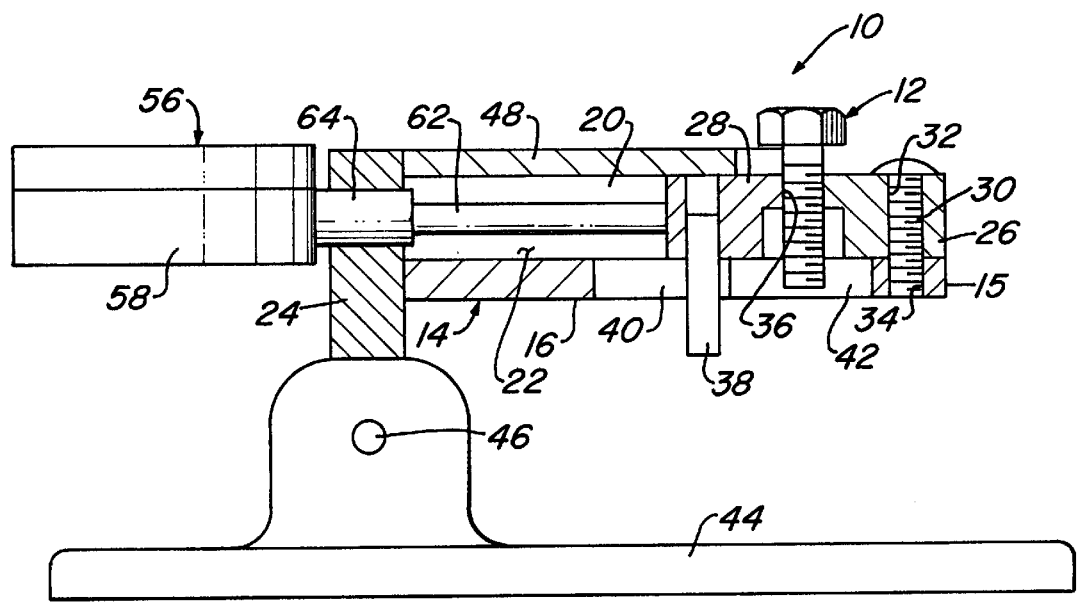
FIG. 1 is a cross-sectional side view of an external thread measuring gage constructed in accordance with the invention.
Figure 2:
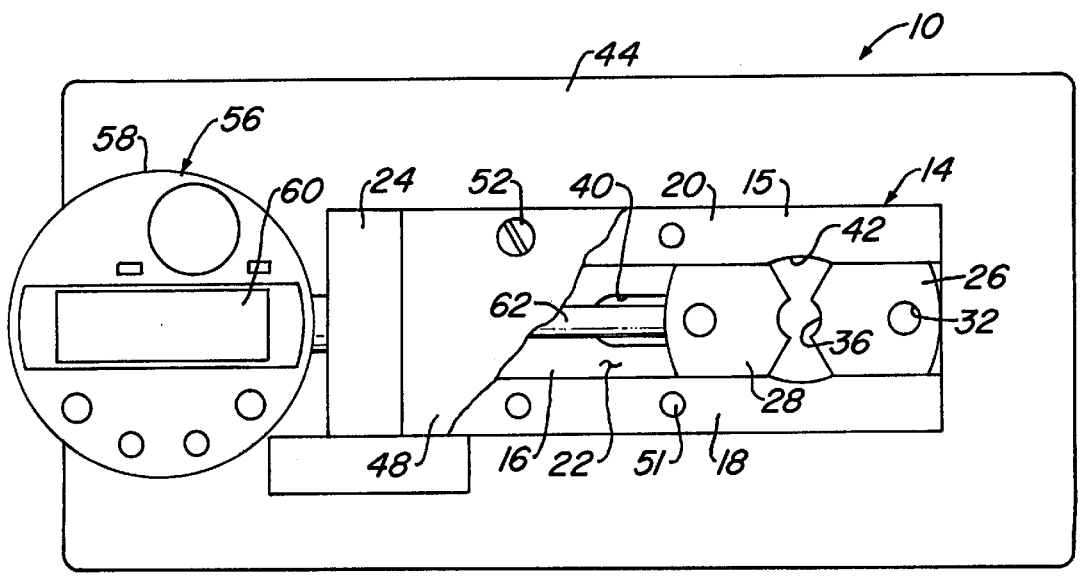
FIG. 2 is a top plan view of the external thread measuring gage of FIG. 1.

Referring to the figures, FIG. 1 shows an external thread gage 10 for measuring threaded fasteners, such as the threaded bolt or screw 12. The gage 10 consists of a segment housing 14 that is formed from a solid metal body 15 having a bottom 16 that extends between a pair of opposite, upright sidewalls 18, 20 (FIGS. 2–4) to define a longitudinal channel 22. The width of the channel 22 is machined to be within precise tolerances. A housing endplate 24 is mounted to one end of the metal body 15 to close the longitudinal channel 22.

Figure 5:
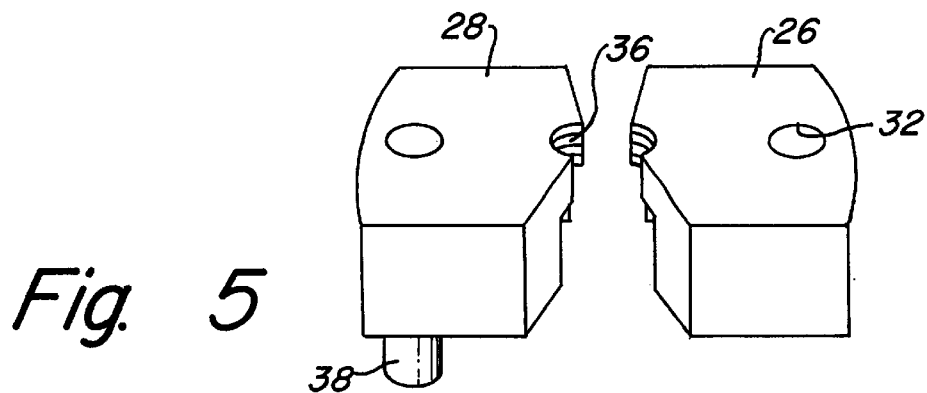
FIG. 5 is a perspective view of the segments of the thread gage constructed in accordance with the invention.

Provided with the housing 14 are a pair of gage segments 26, 28. The gage segment 26 is a fixed segment that is stationarily mounted within the channel 22 opposite the endplate 24 by means of a fastener 30. The fastener 30 consists of a threaded bolt or screw that extends through hole 32 formed in the segment 26 and into hole 34 formed in the bottom 16 of the housing body 15. The fixed segment 26 effectively closes off the end of the channel 22 opposite the endplate 24. The segment 28 is a sliding segment that is received within the channel 22 between the stationary segment 26 and the endplate 24. Both segments 26, 28 are machined to be closely received within the machined channel 22 so that lateral movement of the segments within the channel 22 is minimized and the segments 26, 28 are maintained in proper alignment. The channel 22, however, should provide enough clearance to allow linear movement of the sliding segment 28 within the channel 22. Each segment 26, 28 has a threaded engagement portion 36 (FIG. 5) on its innermost end that has precisely machined threads formed thereon that are used for engaging the external threads of the threaded fastener to be measured.

Extending from the lower surface of the sliding segment 28 is a retracting pin 38. The retracting pin 38 passes through a longitudinal slot 40 formed in the bottom 16 of the housing body 15. The longitudinal slot 40 opens into a large circular opening 42 formed in the bottom 16 of the housing body 15. The opening 42 is located directly beneath the engagement portion 36 of the stationary segment 26 so that large bolts or screws can extend through the bottom 16 while they are being measured.

The segment housing 14 is mounted to a base 44 by means of the endplate 24, which is pivotally secured at its lower end to the base 44 at pivotal connection 46 so that the segment housing 14 can be positioned at different angles if desired.

Figure 3:
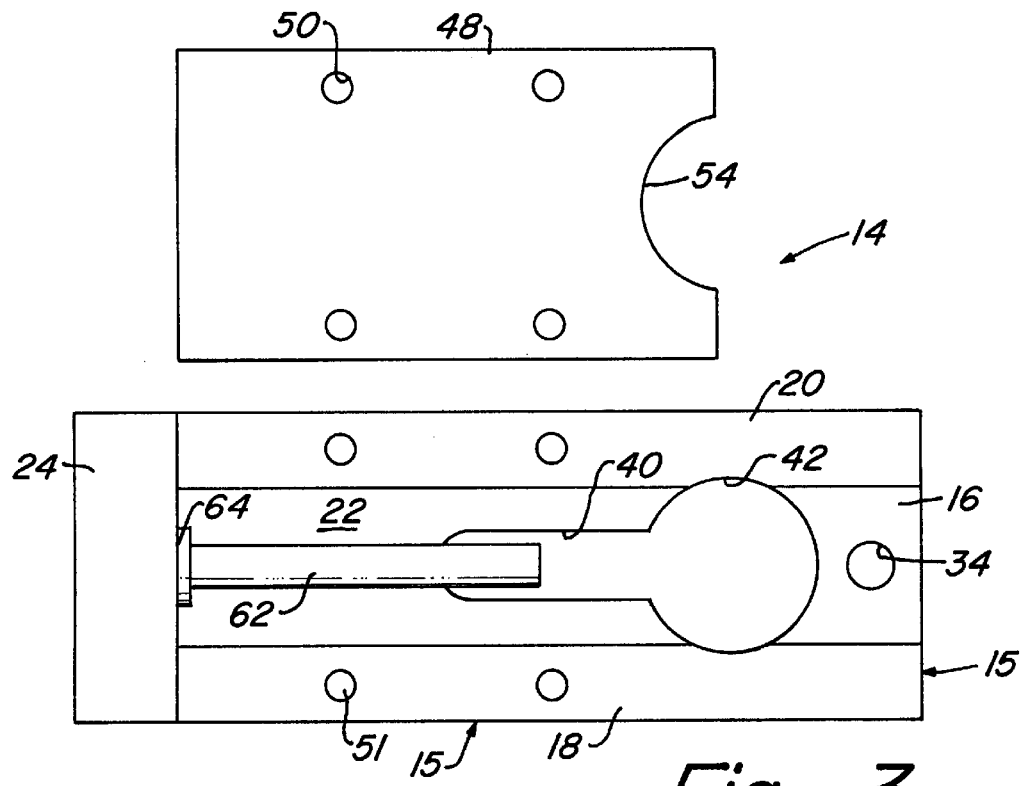
FIG. 3 is a top plan view of a segment housing of the external thread measuring gage, shown with segments of the gage removed and constructed in accordance with the invention.
Figure 4:
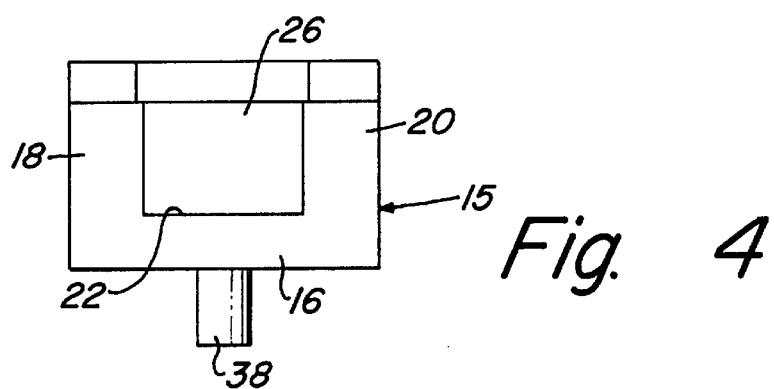
FIG. 4 is an end view of the segment housing of the thread gage constructed in accordance with the invention.

A housing cover plate 48 is provided with the housing body 15. The cover plate 48 has screw holes 50 formed along its periphery, as shown in FIG. 3. The cover plate 48 is placed over the top of the housing body 15 to cover the channel 22. The holes 50 are aligned with holes 51 formed in the upper edges of sidewalls 18, 20. Screws 52 (FIG. 2) that extend through the holes 50, 51 are used to mount the cover plate 48 to the housing body 15. As shown in FIG. 3, the cover plate 48 has an arc-shaped recess 54 that overlays and corresponds to the circular opening 42 formed in the bottom of the housing body 15. The recess 54, like the opening 42, provides a clearance for accommodating the bolts or screws being measured.

An indicator, designated generally at 56, is mounted to the endplate 24. The indicator 56 is electronic and is comprised of an indicator body 58 that houses the electronic components of the indicator 56. A suitable commercially available indicator is the Model 543-177 indicator available from Mitutoyo Corp. A digital display 60 of the indicator 56 provides a readout of the measured values. Extending from the indicator body 58 is an indicator shaft or rod 62. The indicator shaft 62 extends through a collar 64 mounted to the endplate 24. The indicator shaft 62 projects longitudinally into the channel 22 of the housing body 15. The indicator shaft 62 is reciprocally movable along a linear path to actuate the indicator 56. A reading is displayed on display 60 corresponding to the degree of longitudinal movement of the indicator shaft corresponding to a reference position of the indicator shaft 62. The indicator shaft 62 is spring biased outward, away from the indicator body 58 by means of a spring (not shown).

The operation of the measuring device 10 is as follows. Depending upon the size of the threaded fastener being measured, suitable gage segments 26, 28 are selected. Different gage segments 26, 28 are provided with the device 10 for measuring different size fasteners. The existing stationary segment 26 is removed by unscrewing the bolt or screw 30. Once the stationary segment 26 is removed, the sliding segment 28 located within the channel 22 can also be removed through the open end. With the old segments 26, 28 removed, the new sliding segment 28 is positioned within the channel 22 through the open end so the engagement portion 36 of the sliding segment 28 faces opposite the indicator 56 and the retracting pin 38 extends through the bottom slot 40. The spring-biased indicator shaft 62 may have to be retracted in order to insert the segment 28 into the channel 22. The new stationary segment 26 is then placed within the channel 22 and fastened to the housing body 15 by means of the screw 30 so that the channel 22 is effectively closed. The engagement portion 36 of the fixed segment 26 should be positioned over the opening 42 and facing the indicator 56 when so secured. The cover plate 48 ensures that the sliding segment 28 is retained within the channel 22 during operation.

After the segments 26, 28 are selected and mounted within the housing 14, the retracting pin 38 is pulled toward the indicator 56 to open the segments 26, 28. A master setting plug (not shown) having external threads of a desired dimension is used to set the indicator 56. Once the segments 26, 28 are separated, the setting plug is inserted between the segments 26, 28. The retracting pin 38 is then released so that the spring-loaded indicator shaft urges the sliding segment 28 linearly towards the stationary segment 26 to a closed position where the engagement portions 36 of the segments 26, 28 are engaged with the threads of the setting plug. The spring pressure of the indicator shaft 62 should be great enough to firmly hold the setting plug between the gage segments 26, 28. With the setting plug held between the gage segments 26, 28, the setting plug is rotated ¼ turn to ensure that the plug is properly seated between the segments 26, 28.

With the master setting plug 26, 28 seated between the segments 26, 28, the indicator 56 is zeroed or otherwise monitored to determine a base reading. It is important that the indicator shaft 62 bears fully against the sliding segment 28 when the indicator 56 is zeroed out.

After the indicator 56 is zeroed using the master plug, the sliding segment 28 is retracted by pulling the retracting pin 38 towards the indicator 56. This will also depress the indicator shaft 62. With the sliding segment 28 retracted, the setting plug can be removed and a threaded fastener to be measured, such as the fastener 12, is inserted between the gage segments 26, 28. The retraction pin 38 is then released so that the spring loaded indicator shaft 62 urges the sliding segment 28 into engagement with the fastener 12. With the fastener 12 held between the segments 26, 28, the fastener is also rotated ¼ turn to ensure that it is properly seated.

The display 60 of the indicator 56 will display a reading indicating the thread diameter of the fastener 12 as compared to the setting plug that was used to set the indicator 56. If necessary, the thread diameter of the fastener 12 may be measured at more than one position along the length of the fastener by pulling the retraction pin 38 within the slot 40 so that the segments 26, 28 are pulled apart and then moving the fastener 12 to a different position. The segments 26, 28 are then closed at a different position around the fastener 12. The opening 42 in the bottom 16 and the recessed area 54 of the cover plate 48 will accommodate the ends of the fastener 12 as it is being measured. If the thread diameter along the length of any part is out of tolerance at any point it may be rejected.

The thread gage of the invention has many advantages over the prior art. The gage is simple in design and much easier to use than the pivotal-type thread gages of the prior art. By merely sliding the sliding segment linearly within the channel, the segments can be opened and closed around the fasteners being measured. The spring pressure from the indicator shaft ensures that the fasteners being measured are firmly held between the gage segments. Because the segments are positioned within the linear channel of the solid housing body, they are always maintained in proper alignment. There is no need for adjustment to align the segments once the segments are placed within the housing. The segment housing can also be used with different size segments and the segments are easy to remove and replace within the housing.

While the invention has been shown in only one of its forms, it is not thus limited but is susceptible to various changes and modifications without departing from the spirit thereof.

What is claimed is:

1. A gage for measuring the external threads of a threaded body comprising:

a segment housing having a channel with a longitudinal axis, wherein the segment housing is formed from a housing body having a generally U-shaped cross section with a bottom extending between a pair of opposite, upright sidewalls and having a longitudinal slot formed therein, the channel being defined therebetween;

first and second gage segments configured to engage the threads of the threaded body when the threaded body is positioned between the first and second segments and the first and second segments are closed together, the first gage segment being fixed to the housing, and the second gage segment being received within the channel, the second gage segment being linearly movable within the channel along the longitudinal axis to allow the first and second segments to be separated for insertion of the threaded body between the first and second segments and to allow the first and second segments to be closed together for engagement with the threaded body, wherein the second gage segment has a retraction rod that extends through the slot so that the retraction rod can be accessed from the exterior of the housing when the second gage segment is received within the channel, the second gage segment being moved within the channel to separate the gage segments by moving the retraction rod longitudinally within the slot;

means for urging the second gage segment within the channel into engagement with the threaded body; and an indicator having a movable indicator shaft that actuates the indicator, the indicator shaft projecting into the channel of the housing and engaging the second gage segment when the second segment is engaged with the threaded body so that the indicator is actuated to thereby indicate a measured value of the threaded body.

2. A gage for measuring the external threads of a threaded body comprising:

a segment housing formed from a housing body having a generally U-shaped cross section with a bottom extending between a pair of opposite, upright sidewalls that define a channel having a longitudinal axis, wherein the bottom has a longitudinal slot formed therein;

first and second gage segments configured to engage the threads of the threaded body when the threaded body is positioned between the first and second segments and the first and second segments are closed together, the first gage segment being fixed to the housing body, and the second gage segment being received within the channel, the second gage segment being linearly movable within the channel along the longitudinal axis to allow the first and second segments to be separated for insertion of the threaded body between the first and second segments, and to allow the first and second segments to be closed together for engagement with the threaded body, wherein the second gage segment has a retraction rod that extends through the slot so that the retraction rod can be accessed from the exterior of the housing when the second gage segment is received within the channel, the second gage segment being moved within the channel to separate the gage segments by moving the retraction rod longitudinally within the slot; and an indicator having a movable indicator shaft that actuates the indicator and is mounted to the housing body, the indicator shaft being spring loaded so that the indicator shaft projects into the channel of the housing and engages the second gage segment, the indicator shaft moving linearly and parallel to the longitudinal axis of the channel, the indicator shaft urging the second gage segment within the channel into engagement with the threaded body so that the second segment engages the threaded body and the indicator is actuated to thereby indicate a measured value of the threaded body.

\* \* \* \* \*